(12) United States Patent
Olguin Olguin et al.

(10) Patent No.: US 10,049,336 B2
(45) Date of Patent: Aug. 14, 2018

(54) SOCIAL SENSING AND BEHAVIORAL ANALYSIS SYSTEM

(71) Applicant: Sociometric Solutions, Inc., Boston, MA (US)

(72) Inventors: Daniel Olguin Olguin, Boston, MA (US); Tuomas Jaanu, Helsinki (FI); Derek Heyman, Brookline, MA (US); Benjamin Waber, Watertown, MA (US)

(73) Assignee: Sociometric Solutions, Inc., Boston, MA (US)

( * ) Notice: Subject to any disclaimer, the term of this patent is extended or adjusted under 35 U.S.C. 154(b) by 673 days.

(21) Appl. No.: 14/276,871

(22) Filed: May 13, 2014

(65) Prior Publication Data
US 2014/0249891 A1    Sep. 4, 2014

Related U.S. Application Data

(63) Continuation-in-part of application No. 14/172,872, filed on Feb. 4, 2014, now Pat. No. 9,443,521.
(Continued)

(51) Int. Cl.
*G06Q 10/00* (2012.01)
*G06Q 10/06* (2012.01)
*G06Q 50/00* (2012.01)

(52) U.S. Cl.
CPC ......... *G06Q 10/0639* (2013.01); *G06Q 50/01* (2013.01)

(58) Field of Classification Search
CPC ........................... G06Q 50/01; G06Q 10/0639
(Continued)

(56) References Cited

U.S. PATENT DOCUMENTS

| 4,837,568 A | 6/1989 | Snaper |
| 5,960,085 A * | 9/1999 | de la Huerga ........ A61J 1/1437 235/380 |

(Continued)

FOREIGN PATENT DOCUMENTS

| EP | 2 590 432 A1 | 5/2013 |
| JP | 2001-327472 | 11/2001 |

(Continued)

OTHER PUBLICATIONS

Daniel Olguin Olguin (Sociometric Badges: Wearable Technology for Measuring Human Behavior, MIT, Published Jun. 2007).*
(Continued)

*Primary Examiner* — Hafiz A Kassim
(74) *Attorney, Agent, or Firm* — Hamilton, Brook, Smith & Reynolds, P.C.

(57) ABSTRACT

A method and system for capturing and analyzing human behavior data is disclosed. The present disclosure describes a method and system for a plurality of people, wherein each person wears a badge. The badge transmits data collected from a plurality of sensors from the badge to a base station. The data is sent from the base station to a server, which aggregates the data from a plurality of base stations, and then analyzes and processes the data to create raw human behavior data. From the raw human behavior data and plurality of metrics is calculated, which can be displayed on a computer screen according to whichever metrics a user wishes to view.

32 Claims, 11 Drawing Sheets

Related U.S. Application Data

(60) Provisional application No. 61/832,580, filed on Jun. 7, 2013, provisional application No. 61/764,911, filed on Feb. 14, 2013.

(58) Field of Classification Search
USPC .................................................... 705/7.38
See application file for complete search history.

(56) References Cited

U.S. PATENT DOCUMENTS

| | | | |
|---|---|---|---|
| 6,008,727 A | 12/1999 | Want et al. | |
| 7,367,497 B1 | 5/2008 | Hill | |
| 7,376,969 B1* | 5/2008 | Njemanze | G06F 21/55 709/224 |
| 7,656,255 B2 | 2/2010 | Abel et al. | |
| 7,656,274 B2 | 2/2010 | Sato et al. | |
| 7,676,034 B1* | 3/2010 | Wu | H04M 3/5233 379/265.01 |
| 8,138,945 B2 | 3/2012 | Hayakawa et al. | |
| 8,332,180 B2 | 12/2012 | Partridge et al. | |
| 8,706,827 B1* | 4/2014 | Noble | G10L 13/027 704/9 |
| 8,843,372 B1 | 9/2014 | Isenberg | |
| 9,443,521 B1 | 9/2016 | Olguin Olguin et al. | |
| 2002/0028988 A1 | 3/2002 | Suzuki et al. | |
| 2004/0172252 A1 | 9/2004 | Aoki et al. | |
| 2004/0189474 A1 | 9/2004 | Borovoy et al. | |
| 2006/0148528 A1 | 7/2006 | Jung et al. | |
| 2006/0184410 A1* | 8/2006 | Ramamurthy | G06Q 10/10 706/8 |
| 2006/0282303 A1* | 12/2006 | Hale | G06Q 10/063 705/7.11 |
| 2007/0005654 A1* | 1/2007 | Schachar | G06Q 10/00 |
| 2007/0226248 A1* | 9/2007 | Darr | G06Q 10/10 |
| 2008/0082393 A1* | 4/2008 | Ozzie | G06F 17/30575 705/7.11 |
| 2008/0111832 A1 | 5/2008 | Emam et al. | |
| 2008/0183525 A1 | 7/2008 | Tsuji et al. | |
| 2008/0208671 A1* | 8/2008 | Ehrlich | G06Q 30/02 705/7.14 |
| 2009/0006608 A1* | 1/2009 | Gupta | G06Q 10/10 709/224 |
| 2009/0132652 A1* | 5/2009 | Athale | G06Q 10/00 709/204 |
| 2009/0228318 A1* | 9/2009 | Ara | G06Q 10/06398 705/7.42 |
| 2009/0313346 A1* | 12/2009 | Sood | G06Q 10/10 709/207 |
| 2010/0058480 A1* | 3/2010 | Hedberg | A61B 5/6843 726/26 |
| 2010/0211439 A1* | 8/2010 | Marci | G06Q 10/10 705/7.29 |
| 2010/0274639 A1 | 10/2010 | Tsuji et al. | |
| 2011/0054834 A1* | 3/2011 | Partridge | G01C 17/28 702/150 |
| 2011/0066714 A1* | 3/2011 | Topham | G06Q 30/02 709/223 |
| 2011/0072052 A1* | 3/2011 | Skarin | G06Q 10/10 707/794 |
| 2011/0092337 A1 | 4/2011 | Srinivasan et al. | |
| 2011/0099054 A1 | 4/2011 | Moriwaki et al. | |
| 2011/0201959 A1 | 8/2011 | Price et al. | |
| 2011/0270845 A1* | 11/2011 | Lin | G06F 17/30864 707/748 |
| 2013/0013014 A1 | 1/2013 | Donnelly et al. | |
| 2013/0039498 A1 | 2/2013 | Adachi et al. | |
| 2014/0081637 A1 | 3/2014 | Wren et al. | |
| 2014/0163981 A1 | 6/2014 | Cook et al. | |
| 2015/0206011 A1 | 7/2015 | Jerauld | |

FOREIGN PATENT DOCUMENTS

| | | |
|---|---|---|
| JP | 2010-257166 | 11/2010 |
| JP | 2011197768 A | 6/2011 |
| JP | 2013105374 A | 5/2013 |
| JP | 2013003942 A | 7/2013 |
| JP | 2013-008149 | 10/2013 |
| JP | 2016-524230 | 8/2016 |
| KR | 10-2008-0087002 | 9/2008 |
| WO | WO 2007/070298 A1 | 6/2007 |
| WO | WO 2010/008685 A2 | 1/2010 |
| WO | WO 2010/099488 A1 | 9/2010 |
| WO | 2013043393 A | 3/2013 |
| WO | WO 2014/197176 | 12/2014 |

OTHER PUBLICATIONS liana Mushin (Silence is talk: Conversational silence in Australian Aboriginal talk-in-interaction, 2009).*
Meeting mediator: enhancing group collaboration using sociometric feedback T Kim, A Chang, L Holland, AS Pentland—Proceedings of the 2008 ACM . . . , 2008—dl.acm.org.*
Productivity through coffee breaks: Changing social networks by changing break structure BN Waber, D Olguin Olguin, T Kim . . .—Available at SSRN . . . , 2010—papers.ssrn.com.*
Organizational engineering using sociometric badges BN Waber, D Olguin Olguin, T Kim . . .—Available at SSRN . . . , 2007—papers.ssrn.com.*
Aleksandar Matic (Sensing Social Interactions Using Non-Visual and Non-Auditory Mobile Sources, Maximizing Privacy and Minimizing Obtrusiveness, May 2012).*
Kiran K. Rachuri (Smartphones based Social Sensing: Adaptive Sampling, Sensing and Computation offloading, University of Cambridge—Computer Laboratory St. John's College, 2012).*
Hans Weghorn, Jörg Roth and Pedro Isaias (Wireless Applications and Computing 2011 Part of the IADIS Multi Conference on Computer Science and Information Systems 2011).*
Panagiotis D. Ritsos (Architectures for Untethered Augmented Reality Using Wearable Computers). (Year: 2006).*
Sung Park, Ivo Locher, Andreas Savvides, Mani B. Srivastava, Alvin Chen, Richard Muntz, Spencer Yuen (Design of a Wearable Sensor Badge for Smart Kindergarten—ieeexplore.ieee.org). (Year: 2002).*
Zhiwen Yu, Zhiyong Yu, Hideki Aoyama, Motoyuki Ozeki, Yuichi Nakamura (Capture. Recognition, and Visualization of Human Semantic Interactions in Meetings) (Year: 2009).*
Notification of Transmittal of the International Preliminary Report on Patentability dated Dec. 17, 2015, for International Application No. PCT/US2014/038035 entitled "Social Sensing and Behavioral Analysis System".
Ara, K. et al., "Predicting Flow State in Daily Work through Continuous Sensing of Motion Rhythm", IEEE Sixth International Conference on Networked Sensing Systems (INSS) (Jun. 17-19, 2009).
Notification of Transmittal of the International Search Report and The Written Opinion of the International Searching Authority dated Feb. 6, 2015 for International Application No. PCT/US2014/038035 entitled "Social Sensing and Behavioral Analysis System".
Adar, E., "Guess: a language and interface for graph exploration," *CHI '06 Proceedings of the SIGCHI conference on Human Factors in computing systems*, pp. 791-800 (2006).
Basu, S., et al., "Towards Measuring Human Interactions in Conversational Settings," *Proceedings of the IEEE International Workshop on Cues in Communication* (2001).
Bergstrom, T. & Karahalios, K., "Conversation Clock: Visualizing audio patterns in co-located groups," *Proceedings of the Hawaii International Conference on System Sciences*, p. 78 (2007).
Choudhury, T. and Pentland, A., "Modeling Face-to-Face Communication using the Sociometer", *Workshop Proceedings of Ubicomp (Workshop: Supporting Social Interaction and Face-to-Face Communication in Public Spaces)*; Seattle, WA; (Oct. 2003).
Choudhury, T. and Pentland, A., "Sensing and Modeling Human Networks using the Sociometer"; *Proceedings of the International Conference on Wearable Computing*; White Plains, NY; (Oct. 2003).
Choudhury, T. and Pentland, A., "The Sociometer: A Wearable Device for Understanding Human Networks", *Workshop Proceed-*

(56) References Cited

OTHER PUBLICATIONS ings of Computer Supported Cooperative Work (Workshop: Ad hoc Communications and Collaboration in Ubiquitous Computing Environments) New Orleans, LA; (Nov. 2002).

Curhan, J., and Pentland, A., "Thin Slices of Negotiation: Predicting Outcomes from Conversational Dynamics within the First 5 minutes," Journal of Applied Psychology, 92(3): 802-811 (2007).

DiMicco, J.M., et al., "Influencing group participation with a shared display," Proceedings of the ACM Conference on Computer Supportive Cooperative Work, pp. 614-623 (2004).

DiMicco, J.M., et al., "Research on the Use of Social Software in the Workplace," Computer Supported Collaborative Workshop Social Networking in Organizations, San Diego, California, Nov. 8-12 (2008).

DiMicco, J.M., et al., "The Impact of Increased Awareness while Face-to-Face," Human-Computer Interaction, 22(1): 47-96 (2007).

Eagle, N., and Pentland, A., "Eigenbehaviors: Identifying structure in routine," Behavioral Ecology and Sociobiology, 63(7): 1057-1066 (2009).

Eagle, N., and Pentland, A., "Social Serendipity: Mobilizing social software," Pervasive Computing, IEEE, 4(2): 28-34 (2005).

Gips, J. and Pentland, A., "A Mapping Human Networks", IEEE Int'l. Conf. Pervasive Computing and Communications; Pisa, Italy; (Mar. 2006).

Hendrick, H.W., "Ergonomics in organizational design and management," Ergonomics, 34(6): 743-56 (1991).

Jayagopi, D.B., et al., "Modeling Dominance in Group Conversations Using Nonverbal Activity Cues," Audio, Speech, and Language Processing, IEEE Transactions on, 17(3): 501-513 (2009).

Johnston, I., et al., "Experiences from a wireless sensor network deployment in a petroleum environment," Proceedings of the 2007 International Conference on Wireless Communications and Mobile Computing, pp. 382-387 (2007).

Karantonis, D.M., et al., "Implementation of a Real-Time Human Movement Classifier Using a Triaxial Accelerometer for Ambulatory Monitoring," IEEE Transactions on Information Technology in Biomedicine, 10(1): 156-167 (2006).

Kim, T., et al., "Enhancing Organizational Communication using Sociometric Badges," IEEE 11th International Symposium on Wearable Computing (2007).

Kim, T., et al., "Sociometric badges: Using sensor technology to capture new forms of collaboration," Journal of Organizational Behavior, 33: 412-427 (2012).

Kirkman, B.L., et al., "The impact of team empowerment on virtual team performance: the moderating role of face-to-face interaction," Academy of Management, 47(2): 175-92 (2004).

Koyrakh, I., et al., "Identifying speech and conversations in wearable sensor networks," 2008.

Kyulk, O., et al., "Real-Time Feedback on Nonverbal Behavior to Enhance Social Dynamics in Small Group Meetings," Proceedings of the Converence of Machine Learning for Multi-modal Ineraction, pp. 150-161 (2005).

Laibowitz, et al., "A Sensor Network for Social Dynamics", IPSN '06; Nashville TN; (Apr. 19-21, 2006).

Mark, G., "Meeting at the desktop: an empirical study of virtually co-located teams," Proceedings of the European Conference on Computer Supported Cooperative Work, pp. 159-178 (1999).

Olguin Olguin, D. and Pentland, A., "Sensor-based organisational design and engineering", Int'l. J. Organisational Design and Engineering, vol. 1, Nos. 1and 2; (2010).

Olguin Olguin, D. and Pentland, A., "Social Sensors for Automatic Data Collection", Proceedings of the Fourteenth Americas Conference on Information Systems; Toronto, ON, Canada; (Aug. 14-17, 2008).

Olguin Olguin, D. et al., "Sensible Organizations: Technology and Methodology for Automatically Measuring Organizational Behavior", IEEE Transaction on Systems, Man, and Cybernetics—Part B: Cybernetics, vol. 39, No. 1; (Feb. 2009).

Olguin-Olguin, D., "Sociometric badges: Wearable technology for measuring human behavior," Master's Thesis, Massachusetts Institute of Technology (2007).

Olguin-Olguin, D., et al., "Capturing Individual and Group Behavior with Wearable Sensors," Submitted to the AAAI Spring Symposium on Human Behavior Modeling (2009).

Pedersen, E., et al., "Tivoli: An electronic whiteboard for informal workgroup meetings," Proceedings Conference on Human Factors in Computer Systems, pp. 391-398 (1993).

Pentland, A., "Automatic mapping and modeling of human networks," Physica A, 378: 59-67 (2006).

Stoltzman, W.T., "Toward social signaling framework: Activity and emphasis in speech," Master's Thesis, Massachsetts Institute of Technology (2006).

Streitz, A., et al., "DOLPHIN: Integrated Meeting Support Across LiveBoards, Local and remote Desktop Environments," Proceedings of the ACM Conference on Computer Supported Cooperative Work, pp. 345-358 (1994).

Sung, M., et al., "Wearable feedback systems for rehabilitation," Journal of NeuroEngineering and Rehabilitation, 2: 17-28 (Jun. 2005).

Tang, J., et al., "ConNexus to Awarenex: Extending Awareness of Mobile Users," Proceedings of Conference on Human Factors in Computer Systems, pp. 221-228 (2001).

Trist, E., "The evolution of socio-technical systems: a conceptual framework and an action research program," in Perspectives on Organizational Design & Behavior, Van de Ven, A.H. & Joyce, W.F. pp. 19-75 (1981).

Waber, B. N., et al., "Organizational engineering using sociometric badges," available at SSRN 1073342, (2007).

Waber, B.N., and Pentland, A., "Augmented Social Reality," IEEE 11th International Symposium on Wearable Computing (2007).

Waber, B.N., et al., "Understanding Organizational Behavior with Wearable Sensing Technology," Academy of Management Annual Meeting, Anaheim, CA (2008).

Want, R. and Hopper, A., "Active badges and personal interactive computing objects", IEEE Transaction on Consumer Electronics, vol. 38, No. 02; )1992).

Wu, L., et al., "Mining Face-to-Face Interaction Networks using Sociometric Badges: Predicting Productivity in an IT Configuration Task," Proceedings of the International Conference on Informational Systems (2008).

Yankelovich, N., et al., "Improving Audio Conferencing: Are two ears better than one?," Proceedings on the 2006 Conference on Computer Supported Cooperative Work, pp. 333-342 (2006).

Supplementary European Search Report for EP Application No. 14731467.8, entitled: Social Sensing and Behavioral Analysis System:, Dated: Dec. 9, 2016.

Banerjee, N., "Virtual Compass: relative positioning to sense mobile interactions", Microsoft Technical Report MSR-TR-2010-5, 2010, pp. 1-25.

\* cited by examiner

SOCIAL SENSING AND BEHAVIORAL ANALYSIS SYSTEM

RELATED APPLICATIONS

This application claims the benefit of U.S. Provisional Application No. 61/832,580, filed on Jun. 7, 2013, and is a continuation-in-part of U.S. patent application Ser. No. 14/172,872, filed on Feb. 4, 2014, which claims benefit of U.S. Provisional Application No. 61/764,911, filed on Feb. 14, 2013. The entire teachings of the above applications are incorporated herein by reference.

BACKGROUND OF THE INVENTION

Sensing and modeling social networks within an organization can be of benefit to enhance productivity and workplace happiness. Specifically, researchers look to capture phone, email, or other virtual means of communication in an effort to develop a complete model of a human network. Using a data-driven research approach, researchers can understand how communication networks function in an organization.

But, attempting to capture the interactions of numerous members of a larger organization can be difficult, if not seemingly impossible. Typically, many researchers are limited to studying the interactions of only a few users, with many of these interactions requiring subjective input from the users that may ultimately affect the data. To overcome the bottleneck of the number of people that can be surveyed in a human behavioral research study, various organizations have proposed using a wearable computer to gather information from a larger number of users.

The wearable computers generally rely on infrared transmission and are large and noticeable amongst others within the communication network. Additionally, certain wearable computers require the user to input subjective measures of how the user felt during certain interactions (i.e., the user felt the interaction went well, the user felt the interaction went poorly). Naturally, these shortcomings introduce numerous potential errors for researchers studying human behavior within an organization.

SUMMARY OF THE INVENTION

The present invention overcomes the shortcomings of the prior art by providing a method, system, and computer program product for analyzing human behavior within an organization that may be integrated into an existing personnel identification system. Embodiments have a significantly improved sensor system for capturing human behavior data, and an improved human behavior analysis system for processing captured sensor data.

In one embodiment, the present invention is a method, system, or computer program product for analyzing human behavior within an organization. The method, system, or computer program product comprise providing a plurality of wearable electronic badges to be worn by a plurality of persons, each wearable electronic badge comprising: (a) a unique identification code, (b) a processor, a memory unit, a battery, and (c) a plurality of sensors to capture sensor data. In an example embodiment, the plurality of sensors include the following or equivalents thereof: an infrared sensor, a wireless communication module, a camera, an accelerometer, a compass, a plurality of microphones, an electromagnetic data transfer module, and an inductive battery charger. The electromagnetic data transfer module may be a near field communication (NFC) module, a radio frequency identification (RFID) module. The method, system, or computer program product further comprise transmitting from the wearable electronic badges being worn the sensor data to a server via a base station or directly via the wireless communication module; accepting a plurality of sensor data in the server and processing the plurality of sensor data to create a set of human behavior data; analyzing the set of human behavior data to calculate a plurality of metrics, said analyzing being implemented by one or more processors; and creating and displaying on a computer screen (or otherwise providing) a visualization of the plurality of metrics according to at least one user specification.

In another embodiment, for a given badge, the sensor data includes data about the person wearing the given badge, including at least one of: proximity to another person, direct face-to-face interaction, location, individual speech patterns, conversational turn-taking patterns, orientation, body movement patterns, and posture patterns.

In another embodiment, the sensor data further includes information regarding interactions with the another person.

In another embodiment, the another person is not wearing one of the plurality of wearable electronic badges.

In another embodiment, the proximity of the person to the another person is measured by a combination of at least two of the following: the infrared sensor, the wireless communication module, the compass, and the camera.

In another embodiment, the conversational turn-taking patterns of the person are measured by a combination of at least two of the following: the infrared sensor, the wireless communication module, the compass, the camera, and the plurality of microphones.

In another embodiment, the plurality of wearable electronic badges are implemented into an existing personnel identification network, and the unique identification number is a number assigned by the existing personnel identification network, or manually assigned.

In another embodiment, the plurality of metrics are at least one of: a plurality of social network metrics, a plurality of conversational turn-taking metrics, or a plurality of social signaling metrics.

In another embodiment, the plurality of social network metrics include at least one of: betweenness centrality, degree centrality, cohesion, integration, and exploration.

In another embodiment, the plurality of conversational turn-taking metrics include at least one of: number of turns, number of pauses, number of successful interruptions, number of unsuccessful interruptions, average turn length, average pause length, turn-taking matrix, speaking time, silence time, listening time, overlapping speech time, dominance, interactivity, participation percentage, participation balance, and turn-taking balance.

In another embodiment, the plurality of social signaling metrics include at least one of: activity, consistency, mirroring, and influence; and the plurality of social signaling metrics are calculated based on any one or combination of: body movement patterns, individual speech patterns, and conversational turn-taking patterns.

In another embodiment, the visualization of the plurality of metrics illustrate the relationship between any one of the plurality of metrics and a set of performance metrics, the set of performance metrics selected from: productivity, job satisfaction, employee engagement, and drive.

In another embodiment, the visualization further illustrates a change in the set of performance metrics that correspond with a change in the sensed human behavior.

In another embodiment the visualization of the plurality of metrics further includes a visualization of the plurality of metrics according to (or as a function of) location.

In one embodiment, the present invention is a method, system, or computer program product for analyzing human behavior within an organization. The method, system, or computer program product can comprise providing a plurality of wearable electronic badges to be worn by a plurality of persons, each wearable electronic badge comprising: (a) a unique identification code, (b) a processor, a memory unit, a battery, and (c) a plurality of sensors to capture sensor data. In an example embodiment, the plurality of sensors include: an infrared sensor, a wireless communication module, a camera, an accelerometer, a compass, a plurality of microphones, a near field communication (NFC) module, a radio frequency identification (RFID) module, and an inductive battery charger, wherein the sensor data is captured by the wireless communication module in combination with at least one other of the sensors in the plurality. The method, system, or computer program product further comprise transmitting from the wearable electronic badges being worn the sensor data to a server (via a base station or via the wireless communication module, or otherwise); accepting a plurality of sensor data in the server and processing the plurality of sensor data to create a set of human behavior data; analyzing the set of human behavior data to calculate a plurality of metrics, said analyzing being implemented by one or more processors; and providing (generating) and displaying on a computer screen a visualization of the plurality of metrics according to at least one user specification. In another embodiment the wireless communication module measures a radio signal strength, said measured radio signal strength being used in combination with the captured sensor data from the plurality of sensors to determine when two or more persons are having a conversation.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
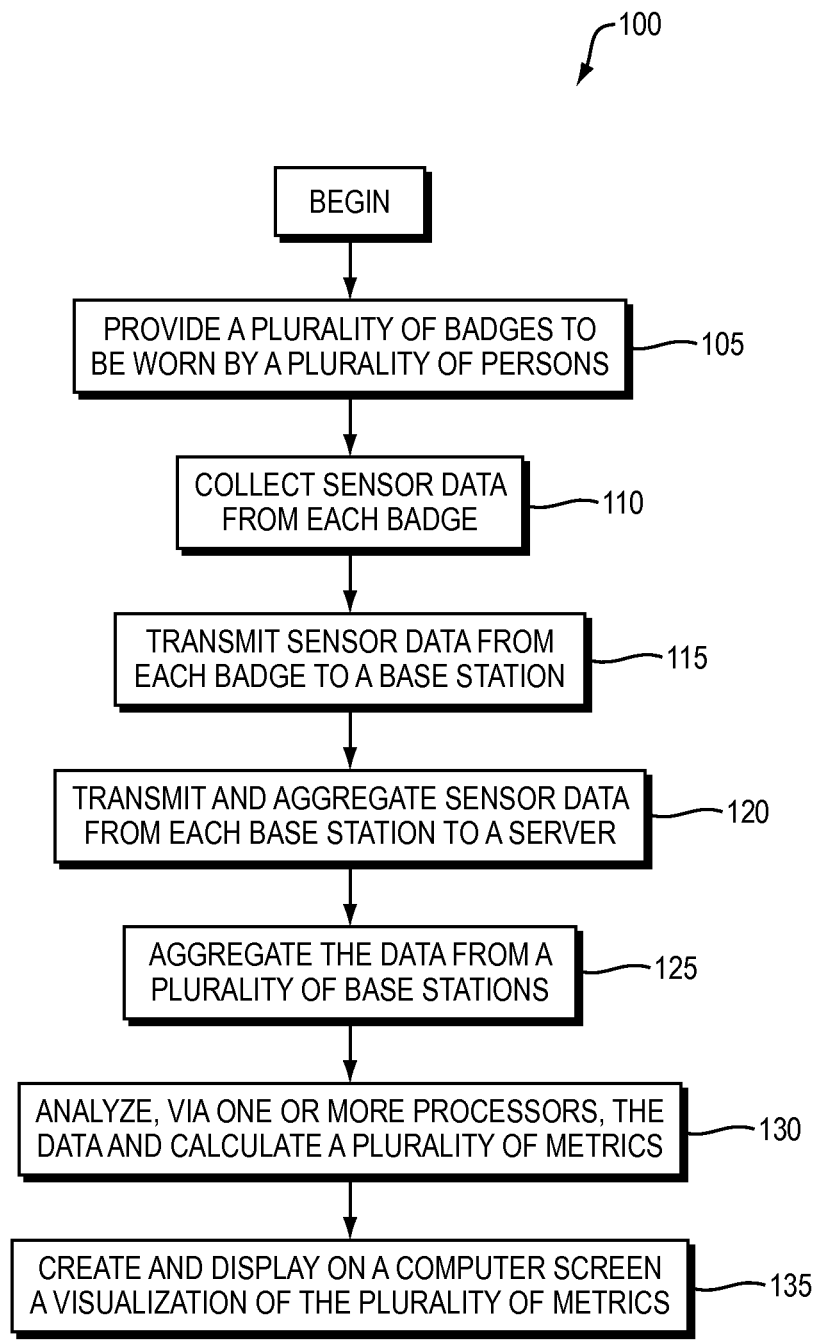
FIG. 1 is a block flow diagram of an example embodiment of the present invention.

FIG. 1 is a block flow diagram of an example embodiment method and system 100 of the present invention. At step 105, a plurality of wearable electronic badges ("badges") are provided to individuals of (people in) an organization, with each person given one badge. The composition of the badges are described in more detail below with respect to FIG. 3. In an example embodiment, each badge is implemented into an existing personnel identification system within the organization. In one example, the badge is implemented into the identification card of a person in an organization. In another example, the badge is a substitute for an identification card for a person in an organization.

Each badge at step 105 is equipped with a plurality of sensors. For each badge, at step 110, the sensor data of the badge is captured and initially stored on the badge. The sensor data captured by the badge includes, for example, proximity to another person, direct face-to-face interaction, location, individual speech patterns, conversational turn-taking patterns, orientation, body movement patters, and posture patterns. The badge is designed to be worn by the person throughout the day as the person interacts with other people, and tracks differences in personal behaviors. Further examples of the types of sensor data are described below under the heading "Analysis."

At step 115, the sensor data from the badge is transferred to a base station. The transfer of sensor data to the base station can be done through any means known to one skilled in the art, including mechanically, electrically, and wirelessly. Wireless data communication or transfer can be achieved, for example, through a local area network or via a wireless radio transfer, such as Bluetooth. In some embodiments, there may be more than one base station, and in other embodiments there may be no base stations as explained below.

At step 120, each base station transmits respective collected sensor data to a server. At step 125 the server can aggregate the data from a plurality of base stations and additionally store the aggregated data in a database. The server can process the aggregated sensor data to yield a set of raw human behavior data. In other embodiments each badge transmits sensor data directly to the server, for example electronically or wirelessly, through a wireless data communication. Other data transfer methods and techniques are suitable so that the sensor receives, aggregates, and stores sensor data from the badges at step 125.

At step 130, the raw human behavior data can be analyzed by a computer or processor to create (or otherwise generate) a plurality of metrics. The calculations to create the plurality of metrics are described briefly below under the heading "Analysis," and in more detail in Applicant's co-pending application, U.S. patent application Ser. No. 14/172,872, which is incorporated herein by reference in its entirety.

At step 135, a visualization of the generated plurality of metrics is created and displayed on a computer screen according to specifications of the user. An example of the visualization, as well as more detail with respect to the user specifications are described below with respect to FIGS. 4A through 4F.

Badges and System Overview

Figure 2:
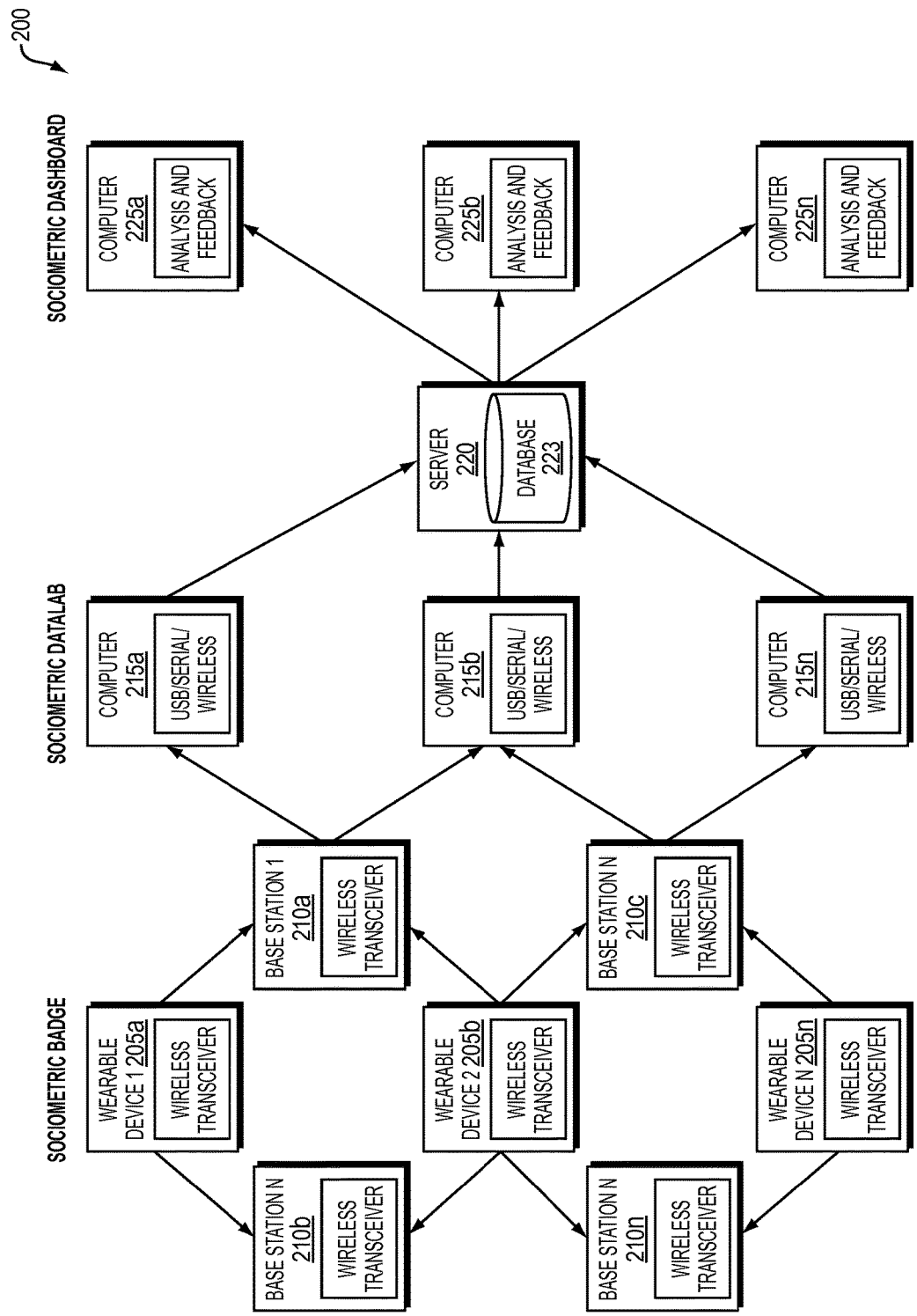
FIG. 2 is an illustration of a system for social sensing and behavioral analysis according to the present invention.

FIG. 2 is an illustration of a computer-based system 200 for social sensing and behavioral analysis implementing the steps of the method 100 of FIG. 1. Within an organization (e.g., employer work site, offices, and the like) a plurality of wearable electronic badges 205a-n can be dispersed amongst a plurality of people (individuals). Each wearable badge 205a-n has a unique identification code, either manually entered by a person, or electronically communicated (or electromagnetically transferred) from an identification card via a near field communication (NFC) module or a radio frequency identification (RFID) module or the like. Further, each badge 205a-n is equipped with a wireless transceiver. In one embodiment, a plurality of base stations 210a-n are placed in various locations throughout the offices or premises of the subject organization or work site. The badges 205a-n transmit sensor data to the base stations 210a-n wirelessly or via a mechanical or electrical coupling, such as by a universal serial bus (USB). Additionally, each base station 210a-n can also have a unique identification code.

In an example embodiment, the base stations 210a-n have a plurality of sensors similar to the sensors in the badges 205a-n, and can be used for location mapping. The base station 210a-n can create a spatial library of communication patterns that can be used in conjunction with the sensor data collected from the badges 205a-n. The combination of these datasets allows for analysis tools to show not only with whom a user interacted with, but also where on the premises said interaction occurred. Office layouts and performance metrics combined with communication and conversational patterns allow for determination as to which spaces promote higher levels of productivity, job satisfaction, employee engagement, and other organizational outcomes.

The base stations 210a-n can transmit the collected sensor data either wirelessly, electrically, or mechanically to a plurality of central computers 215a-n. The central computers 215a-n are connected to a server 220 either wirelessly, mechanically, or electrically. The server 220 can also be connected to a database 223, which may either be housed inside the server 220, or stored externally. The sensor data from the base stations 210a-n is aggregated at the server 220 and processed into human behavior data.

It is understood that a variety of system 200 configurations with or without base stations 210 and/or with or without central computers 215 are suitable. Badges 205 can transmit collected sensor data directly to server 220 wirelessly or via a mechanical or electrical coupling.

The aggregated data and/or processed human behavior data from the server 220 can then be transferred to a computer 225a-n equipped with a display. At the computer 225a-n, the aggregated data and/or human behavior data is analyzed and processed to provide feedback to the user. The user may view on the computer 225a-n any of the user specified metrics he or she chooses.

Figure 3:
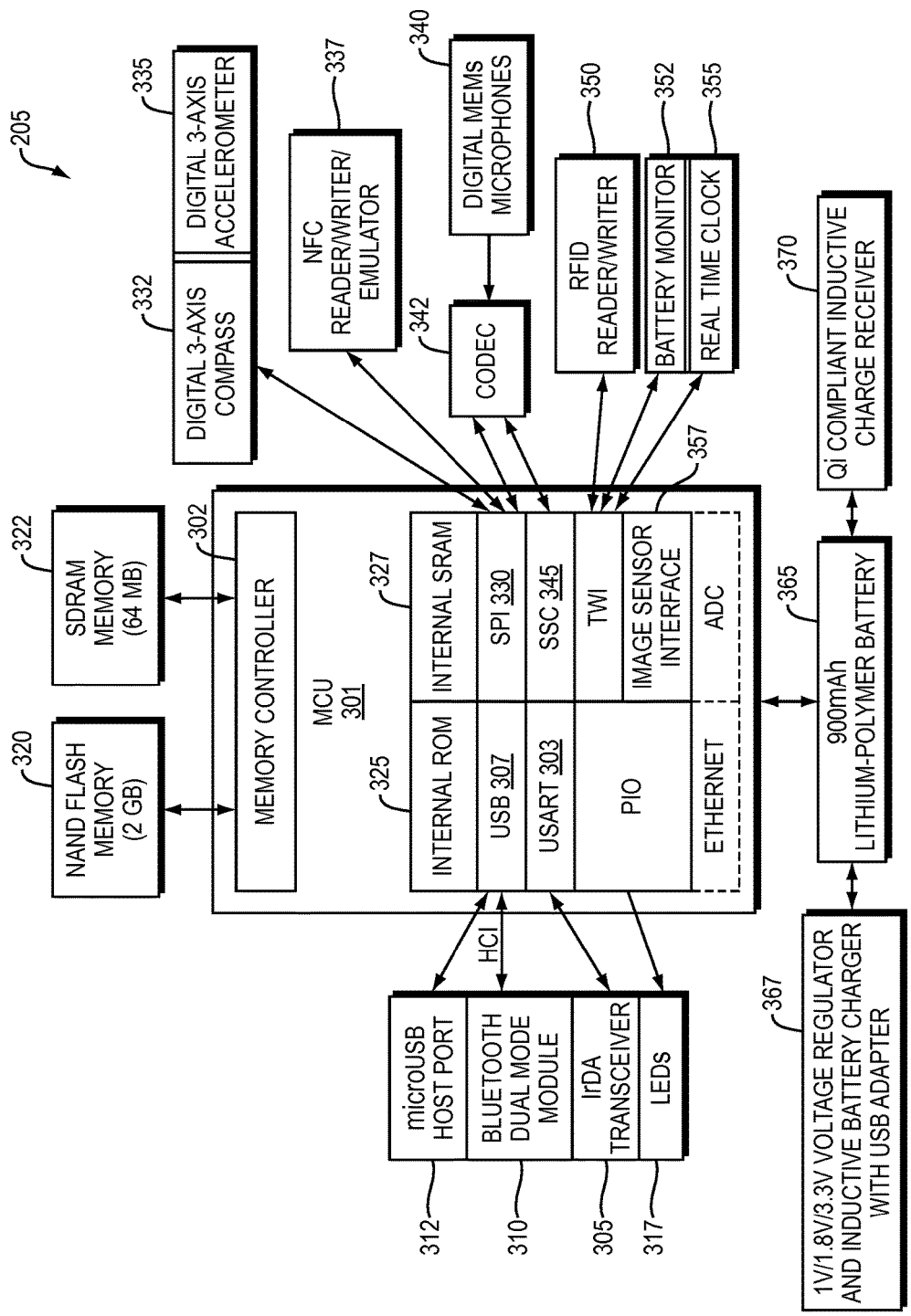
FIG. 3 is a schematic of an example badge of the present invention.

FIG. 3 is a schematic of an example badge 205. The badge 205, via a plurality of sensors, captures real time information about the user's communication, social signaling, and interaction patterns. In an example embodiment, the badge 205 contains a microcontroller 301. The microcontroller runs an embedded operating system that is stored on the NAND Flash Memory 320. The data collected from the sensors is also stored on the NAND Flash Memory 320. The flow of data from the NAND Flash Memory 320 to the microcontroller 301 is achieved through the memory controller 302, which is further coupled to a SDRAM Memory Unit 322. Additionally, the microcontroller 301 can be coupled to an internal read only memory 325, and an internal synchronous random access memory 327.

The sensor data is collected via a number of peripherals connected to the microcontroller 301. The sensor data collected is time stamped from a real time clock 355 within the badge 205. The sensors listed below are by way of example and not intended to be limiting, as anyone of skill in the art may recognize additional or substitute sensors that may still achieve the goals of the present invention.

The badge 205 can be equipped with a plurality of digital MEMs microphones 340. The microphones 340 can be oriented in any direction in order to capture speech and speech patterns not only from the person wearing the badge 205, but also from other individuals in proximity to the person. In an example embodiment, the microphones 340 are capable of capturing speech and speech patterns of individuals not wearing a badge interacting with the person wearing the badge 205. The data collected by the microphones 340 can be processed by an audio codec 342 connected to a serial synchronous controller 345 or a serial peripheral interface bus 330 within the badge 205.

A digital 3-axis compass 332 and a digital 3-axis accelerometer 335 can also be connected to the serial peripheral interface bus 330. The digital compass 332 allows the badge 205 to better collect data on the orientation of the person wearing the badge 205, and can aid the analysis system in determining whether two people were interacting or facing each other. Similarly, the accelerometer 335 can collect data regarding the movement of the person wearing the badge 205. Movement includes, for example, speed of movement, body position including how he or she stands, and/or posture. The data from the compass 332 and the accelerometer 335 can be collected as a single package.

The badge 205 can also be equipped with an infrared data association transceiver (IrDA) 305 for collecting infrared (IR) data. The IrDA 305 can be coupled to a universal asynchronous receiver/transmitter (USART) 303. The IR data is used, in part, to detect proximity to another person and face-to-face interactions. Additionally, the badge 205 can be equipped with an image sensor interface (referred to herein as a camera) 357, used to detect facial expressions when two people are interacting face-to-face. In an example embodiment, the camera 357 is a complementary metal oxide silicon (CMOS) camera.

A wireless communication module, such as a Bluetooth™ dual mode module 310 can be used in the badge 205. The wireless communication module 310 is not limited to Bluetooth™, and can be any short-wavelength UHF radio waves in the ISM band from 2.4 to 2.485 GHz or other suitable wireless communication method. The wireless communication module can collect data (such as radio signals) in conjunction with any of the other sensors in the badge 205. The combination of Bluetooth and IR data (from modules 310, 305) for proximity detection is a unique solution in that it allows for more accurate information about the environment and the people nearby. The limited range of the IR sensors 305 also allows for more accurate detection of face-to-face interactions whereby the IR sensor is used to detect actual face-to-face discussions and the Bluetooth low energy module 310 is used for proximity detection. In one example, the wireless communication module 310 can measure radio signal strength received from another source, such as a badge 205 worn by another person. Combining the measured radio signal strength with captured sensor data from the plurality of sensors can allow the system to determine when two or more persons are having a conversation. In other examples, long range infrared transmissions cause the signals to bounce off walls and thus increase detections of persons out of face-to-face range. Combining Bluetooth (or radio signal strength or data) and IR data with speech data from the microphones 340, it is possible to detect conversations with a much higher accuracy than just by using IR signals of IR sensors 305.

The camera 357 and compass 332 are additions that may help in the detection of face to face interactions. In the case that two IR transceivers 305 are unable to detect each other when two people are interacting, the compass 332 detects the orientation of each user. If the received signal strength indication (RSSI) values received from the Bluetooth Dual Mode Module 310 are strong enough, then it is likely a conversation is occurring if the users are oriented towards each other. In another instance where IrDA Transceiver 305 alone may not be able to detect all users in a conversation, or if a user is interacting with a non-badge wearing participant, the camera 357 can be used for face detection. In conjunction with the IrDA Transceiver 305, the Bluetooth Dual Mode Module 310, the compass 332, and the camera 357 sensors allow for a more accurate portrayal of face-to-face interactions.

The badge 205 can also be powered by a Lithium Polymer Rechargeable Battery 365. The badge 205 can be powered from a momentary on tactile push button whereby a power management system supplies the microcontroller 301, the sensors, and the memory units. The badge 205 can also be equipped with a battery charge monitor 352 to provide accurate information about the remaining capacity of the battery 365. The real time clock 355 can be powered by a low-dropout regulator so as not to draw power from the battery 365.

The badge 205 can also be equipped with an inductive charging receiver 370, such as a Qi compliant inductive charging receiver. A voltage regulator 367 may be coupled to the battery 365. The regulator 367 includes an inductive battery charger with USB adapter. The badge 205 can be equipped with a USB port 307, 312 for direct connection to a base station 210, a computer 215, or a server 220.

Bluetooth Dual Mode Module 310, in conjunction with the inductive charging receiver 370 allows for a completely wireless solution. The Dual Mode Bluetooth Module 310 allows for a low power proximity solution while also ensuring that the device has the capability to connect to computers with existing classic Bluetooth technology at faster data rates.

The badge 205 can also be equipped with a near field communication (NFC) reader/writer/emulator 337 and/or a radio-frequency identification (RFID) reader/writer 350. The NFC module 337 and the RFID module 350 each (separately) allows the badge 205 to identify the person wearing the badge 205 by pairing with an existing identification card that utilizes either NFC or RFID for identification. Additionally, the NFC module 337 and the RFID module 350 allow the badge 205 to be implemented into an existing personnel identification system in an organization, such as by an identification card, or can otherwise supplement existing identification cards. In an example embodiment, the badge 205, when activated, may pair with an identification card of a person. The user can pair the badge 205 with an identification when the badge 205 is turned on and a LED indicator 317 blinks (illuminates), indicating that the device is searching for a NFC module 337 and/or RFID module 350 to pair the badge 205 to a user's identification card. By pairing the badge 205 to the identification card, the badge 205 can store the identity of the person using the badge 205 internal memory. If the badge 205 cannot detect a NFC module 337 or RFID module 350, the badge can also assign a hexadecimal identification code to that particular badge which can be stored for analysis later.

Additionally, the NFC module 337 and the RFID moldule 350 can read other badges or identification cards within proximity to the badge 205. This allows the badge 205 to identify and store indications of people with whom the person wearing the badge 205 is interacting with.

Analysis

This section provides a brief overview of the analysis performed by the badges 205, base stations 210, and computers 215, 220. For a more detailed description, see Applicant's co-pending application, U.S. patent application Ser. No. 14/172,872, which is incorporated herein by reference in its entirety.

The sensor data collected from the badges 205 can be processed and analyzed to calculate a plurality of metrics. The analysis can use any combination of the sensors and respective sensor data to calculate the plurality of metrics, including using sensed data from one or a combination of the IrDA transceiver 305, the Bluetooth Dual Mode Module 310, the compass 332, the plurality of microphones 340, the accelerometer 335, and the camera 357.

In one embodiment, the proximity of the person wearing a badge to another person is measured by sensed data from a combination of at least two of the following: the IrDA transceiver 305, the Bluetooth Dual Mode Module 310, the compass 332, and the camera 357.

In one embodiment, the proximity of the person wearing a badge to another person is measured by a combination of the IrDA transceiver 305 sensed data and the Bluetooth Dual Mode Module 310 sensed data.

In another embodiment, the conversational turn taking patterns of the person wearing a badge is measured by a combination of at least two of the following: the IrDA transceiver 305, the Bluetooth Dual Mode Module 310, the compass 332, the camera 357, and the plurality of microphones 340.

In another embodiment, the conversational turn taking patterns of the person wearing a badge is measured by a combination of sensed data from the Bluetooth Dual Mode Module 310 and the plurality if microphones 340.

In another embodiment, the sensor data is captured by a combination of the Bluetooth Dual Mode Module 310 and any one or more of the remaining plurality of sensors.

Each set of sensor data downloaded from a badge 205 can be grouped such that analysis can be specific to a given project. The structure of each dataset can identify a list of participants, teams, and sessions to group different parameters together for analysis. The sensor data, in isolation or in aggregation, can be exported in any format desired by the user, such as CSV, or to an Excel Spreadsheet.

The different types of output that can be provided include: ScalarDatasource, which produces single value for each participant per session; MultiScalarDatasource, which produces multiple values for each participant per session; TimeSeriesDatasource, where there is one value per time unit per participant; MultiTimeSeriesDatasource, where there are multiple values per time unit per participant; and NetworkDatasource, which is a single network matrix per dataset per session.

The system 200 can also keep track of the various parameters of each badge 205 including Bluetooth MAC address, last time a badge 205 was connected to the method of system 200, and the various configuration parameters of the badge 205. When the badge 205 is connected to the system 200, the software has the ability to update the firmware configurations of the badge 205. In this, the sampling frequencies as well as extra features can be enabled. Changing the sampling frequencies of the various sensors allows the badge 205 to be configured to save power or to collect more data. Such additional features include 128-bit AES encryption, enabling raw audio, enable real time analysis of raw Mel Bands, and enable the device 205 to detect generic Bluetooth devices in addition to the other badges 205.

Examples of the plurality of metrics that may be analyzed include a plurality of social network metrics, a plurality of conversational turn-taking metrics, and a plurality of social signaling metrics.

First, the plurality of social network metrics include metrics such as betweenness centrality, degree centrality, cohesion, integration, and exploration. Betweenness centrality is equal to the number of shortest paths from all vertices to all others that pass through a node where the social network of people is represented by a graph of nodes and vertices (end nodes). Each node or vertex in the graph represents a person in relation to other people in the social network. Degree centrality is defined as the number of ties that a node has. Network cohesion is defined as the minimum number of nodes in a social network that need to be removed in order to disconnect a group. Integration is the number of triads that a node is part of divided by the maximum number of possible triads. Exploration can be calculated as the percentage of time that someone from a group has spent with people outside of that group divided by the total interaction time.

Second, the plurality of conversational turn-taking metrics can include numerous metrics to analyze the quantity and quality of conversation amongst groups. In one embodiment, the metrics can measure turn taking statistics, which include the number of turns a person takes while speaking, the number of pauses, the number of successful/unsuccessful interruptions, the average turn length, and the average pause length. In another embodiment, the metrics measure a turn taking matrix, identifying who talks after whom and how much each person talks within a group. Additionally, the conversational turn-taking metrics can measure the time a person is silent, the time the person is listening, the frequency of overlapping speech (i.e., when two or more people are speaking at the same time). The metrics can also measure the dominance of a speaker, a participation and turn-taking percentage and balance, and the interactivity of the person amongst others.

Third, the plurality of social signaling metrics provides a measure of social signals given and received by a person or group of people. Example metrics include Activity, Consistency, Influence, and Mirroring.

Activity quantifies the overall magnitude of low-level social signals over time. Body movement is generally measured by the accelerometer 335, and includes measurements of the average body movement energy, the acceleration vector magnitude, and posture. The posture of a person consists of two angles, a front/back and a left/right, which can be computed from a raw acceleration vector.

Speech can be measured by the plurality of microphones 340 and the audio codec 342. This metric includes a measurement of the amplitude of speech and the frequency of speech, both measured by fast fourier transform (FFT). Additionally, the raw cepstrum, mel-frequency cepstrum, and the average number of turns can be calculated from the data received from the plurality of microphones 340 and the audio codec 342.

Consistency quantifies how much change or variation there is in low-level social signals over time. This includes consistency in body movement, turn taking, volume, and fundamental voice frequency. The consistency metric can normalize the variation of each metric to account for outliers.

Influence quantifies how much social signals from one person cause changes in social signals across other people during an interaction. This metric compares sensor data amongst a plurality of persons. Data measured under this metric includes measuring a person's influence over another's body movement, influence over another's amplitude, influence over another's frequency, and influence over another's turn taking.

Mirroring quantifies how similar social signals are across people. For example, this metric can measure mirroring of another's body movements, volume, fundamental voice frequency, and turn taking.

Additional metrics that can be measured are integration, interactivity, exploration, drive, engagement, a comparison of that person to their team members, productivity, job satisfaction, and employee engagement.

Visualization

The metrics measured in the "Analysis" section, described above, can be further processed and visualized to be viewed on a display monitor of a computer 225. The Visualization can include information about the individual badge-wearing person, such as a comparison of that person's metrics compared to the average of other people, or the average of a team, or the average of an organization. The "team" can refer to a group of people who self-identify as a team, or are identified as a team by the organization itself or the management. The Visualization can also compare the metrics of various teams in an organization. Specifically, the Visualization can illustrate the relationship between any one of the plurality of metrics and a set of performance metrics. The performance metrics can refer to metrics such as productivity, job satisfaction, employee engagement, and drive. The Visualization can also illustrate how a change in human behavior can affect change in the plurality of metrics.

The Visualization can also calculate the plurality of metrics for the plurality of persons and organize them according to location or office layout. This allows the user to determine where different types of interactions are occurring within an organization.

Additionally, the Visualization can include information about the organization as a whole. Examples of visualizations that may be generated based on the data about the organization include an overview of the organizational dynamics; how individuals within the organization interact with each other; and graphical depictions of how, where, and when users communicate face-to-face. The Visualization can also include data regarding email communication between users, instant messaging communications, phone communications, and face-to-face interactions.

Figure 4A:
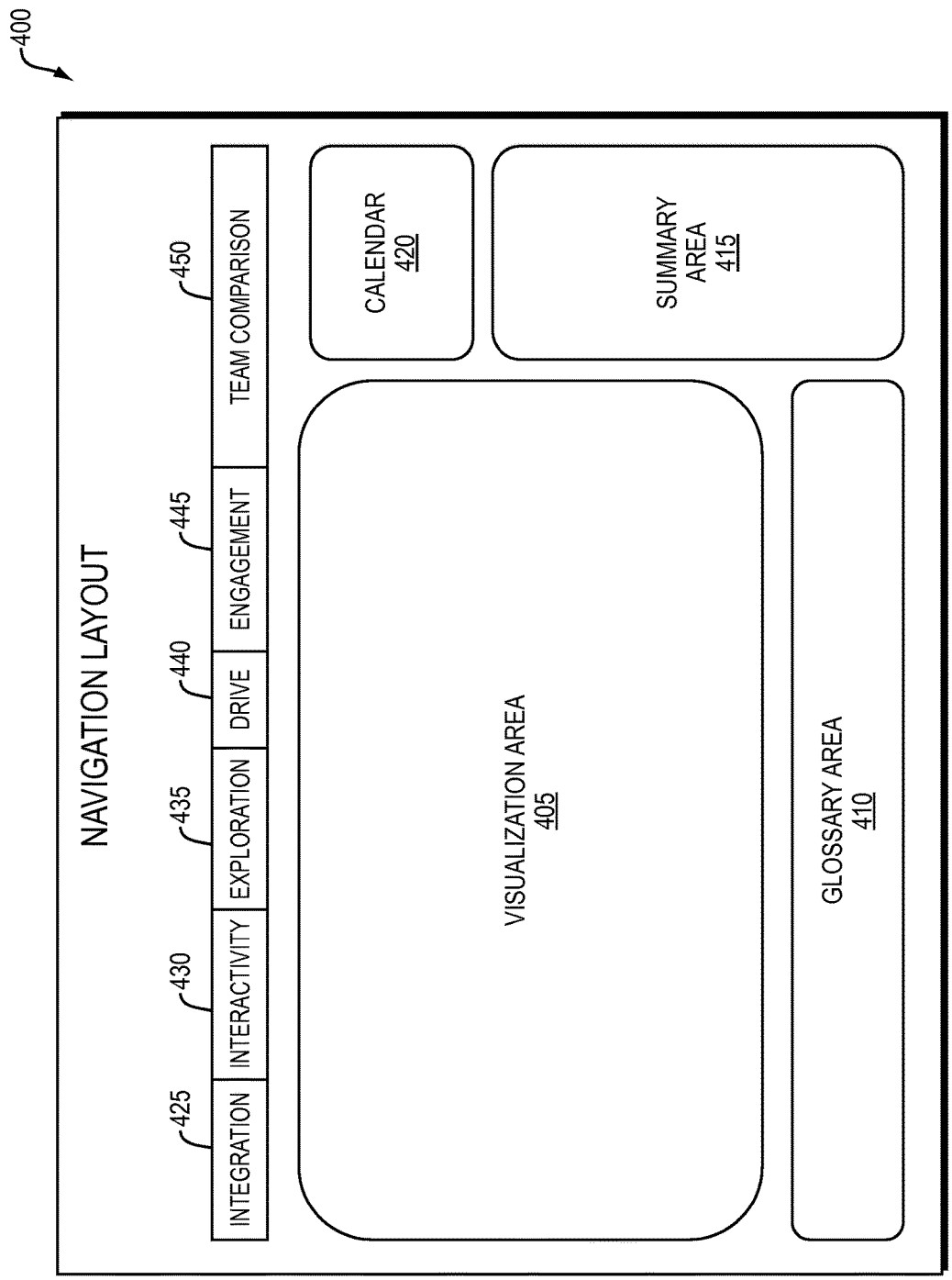
FIGS. 4A-4F are example graphical user interface views of an analysis of the metrics calculated in the present system.

FIG. 4A is an example graphical user interface of a visualization generated by embodiments of the present invention. A visualization area 405 can display information about the measured metrics. The information can include graphs, tables, or other charts which allow the user to easily read and understand the data. The glossary area 410 can provide explanations for the various items displayed in the visualization area 405. The summary area 415 can summarize the data. The calendar (Date Selection) area 420 allows the user to select different dates or ranges of dates on a calendar and view data for that corresponding date or time period. As noted above, the data is time stamped through the use of a real time clock 355 in the badge 205. This allows the analysis system to identify when certain actions were performed. Additionally, the Visualization can demonstrate trends in behavior data. The user can select a range of dates in the calendar area 420 and the visualization area 405 can provide graphs, tables, or charts of data for the range of user-selected dates.

Additionally, the user can specify which metrics he or she wishes to view. Example metrics in FIG. 4A include integration 425, interactivity 430, exploration 435, drive 440, engagement 445, and team comparison 450. More metrics or less metrics may be included in the user interface, and the metrics recited above are merely by way of example.

Figure 4B:
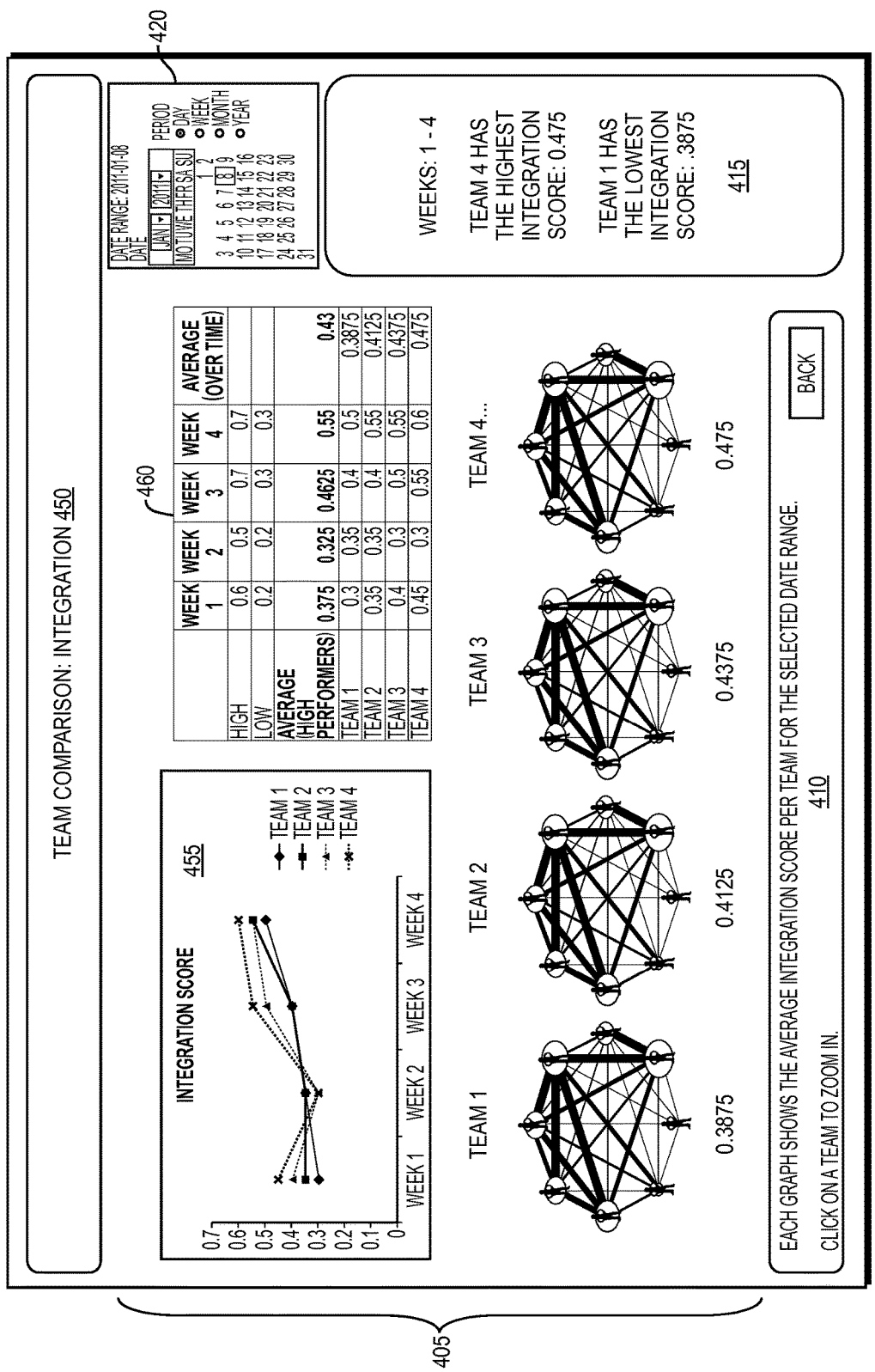

FIG. 4B is an example graphical user interface screen view of the team comparison 450 visualization. Team integration 425 can be, for example, measured as the number of triads (groups of three people) that a person is a part of compared to the number of possible triads. Using this information, the Visualization area 405 can create a visualization of how each member of a team interacts with other members of the team. Additionally, in the example in FIG. 4B, the visualization area 405 can illustrate the integration values for four teams, and, in the summary area 415, highlight which team had the highest integration score and which team had the lowest. As noted above, the user may also select a date range in the calendar area 420. As illustrated in the Visualization area 405, each team's integration score is charted in a line graph 455 across four weeks. Next to the line graph 455, the data of the integration values over four weeks is tabulated in table 460.

Figure 4C:
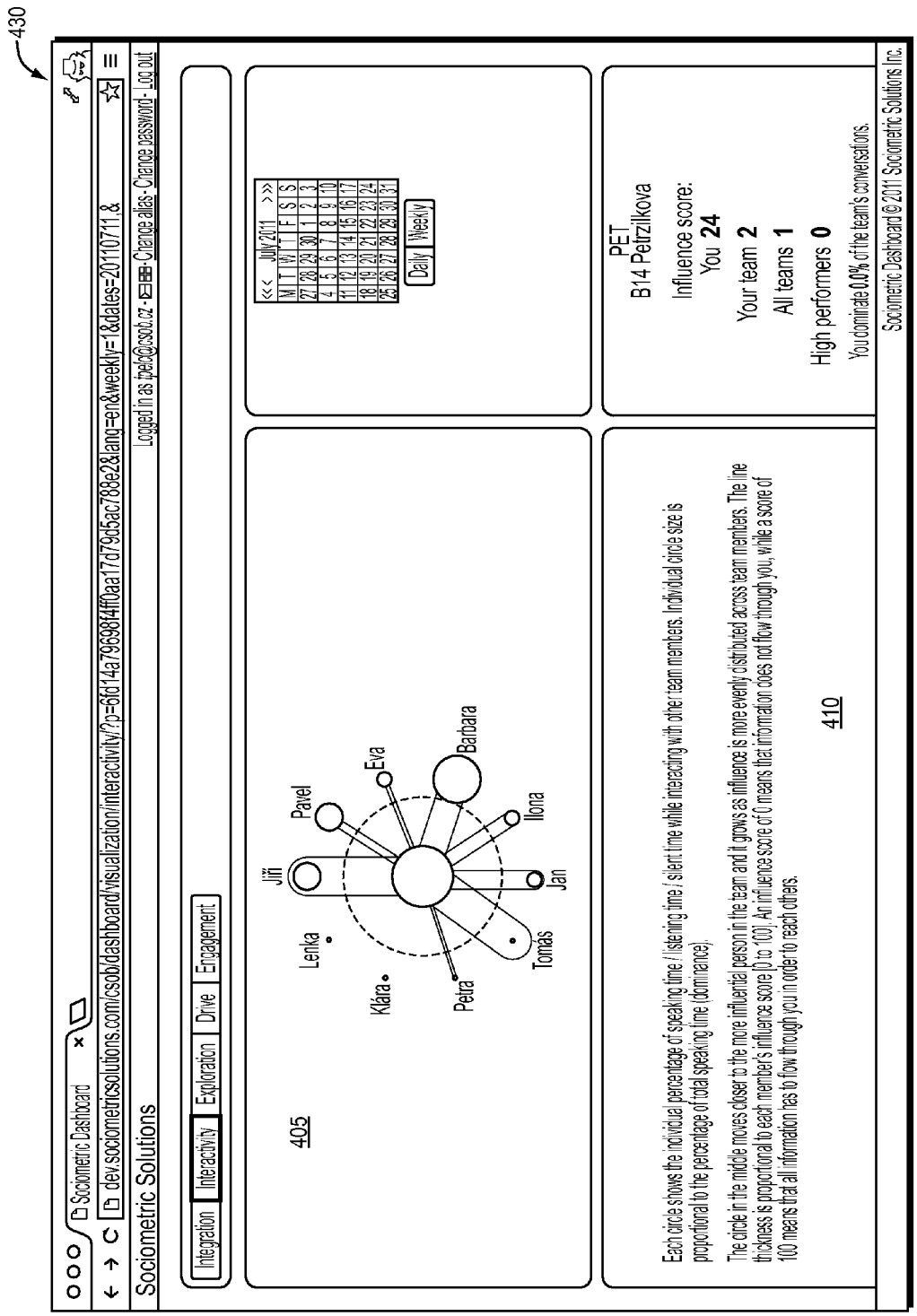
Figure 4D:
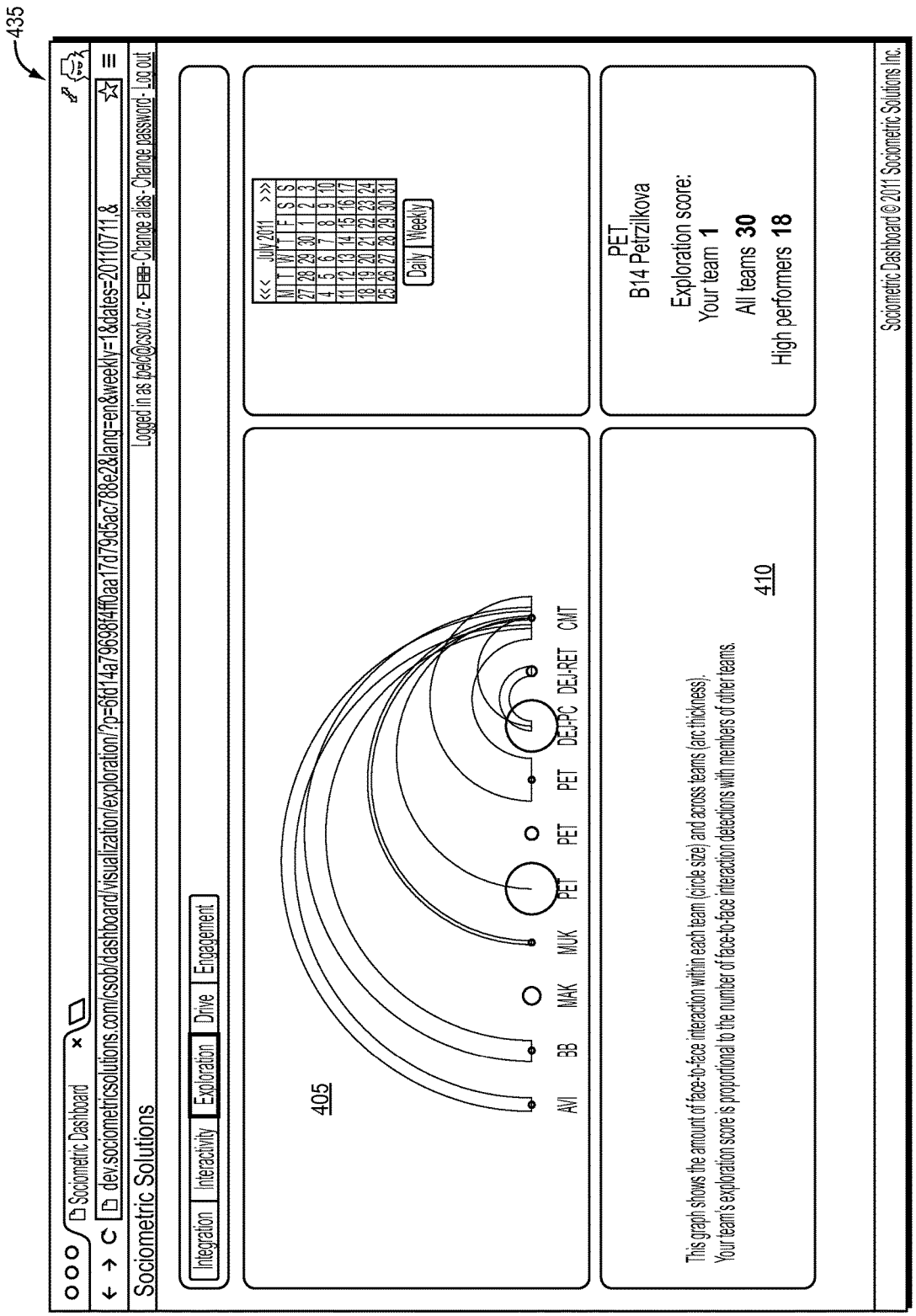

FIG. 4C is an example graphical user interface screen view generated to illustrate a team's interactivity 430. Team interactivity 430 is measured from the turn-taking matrix and/or participation balance over any length of time (e.g., minute-by-minute, hour-by-hour, or for an entire session). In FIG. 4D the visualization area 405 displays a graph with different sized circles. As explained in the glossary area 410, the size of each circle is proportional to the respective percentage of total speaking time.

FIG. 4D is an example graphical user interface screen view generated to illustrate an organization's exploration 435. An organization's exploration 435 is the amount of face-to-face interaction within each team within an organization, as well as how much interaction a team has with other teams.

Figure 4E:
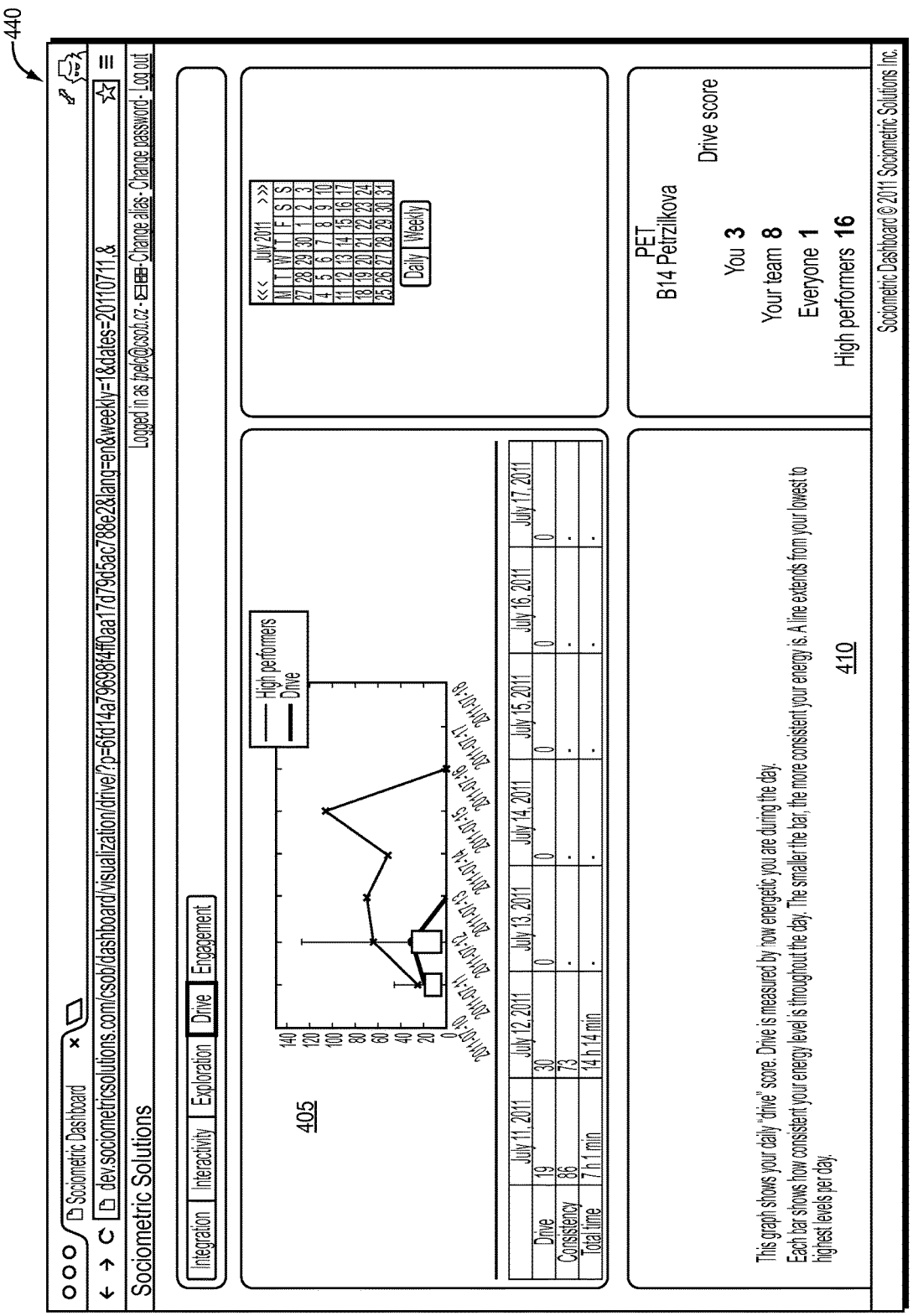

FIG. 4E is an example graphical user interface screen view generated to illustrate an individual's energy. The visualization area 405 illustrates a graph of a person's drive 440 score. Drive 440 is explained in the glossary area 410 as to what degree or how energetic a person is during the day. Energy is proportional to the amount of body movement throughout the day, and it can be computed using the accelerometer 335 sensor data as the magnitude of the 3-axis acceleration vector (sample-by-sample, second-by-second, minute-by-minute, or at any other time resolution). Additionally, body posture and posture changes can also be estimated using two angles (front/back and left/right) computed from the raw acceleration vector (arccosine of the dot product).

Figure 4F:
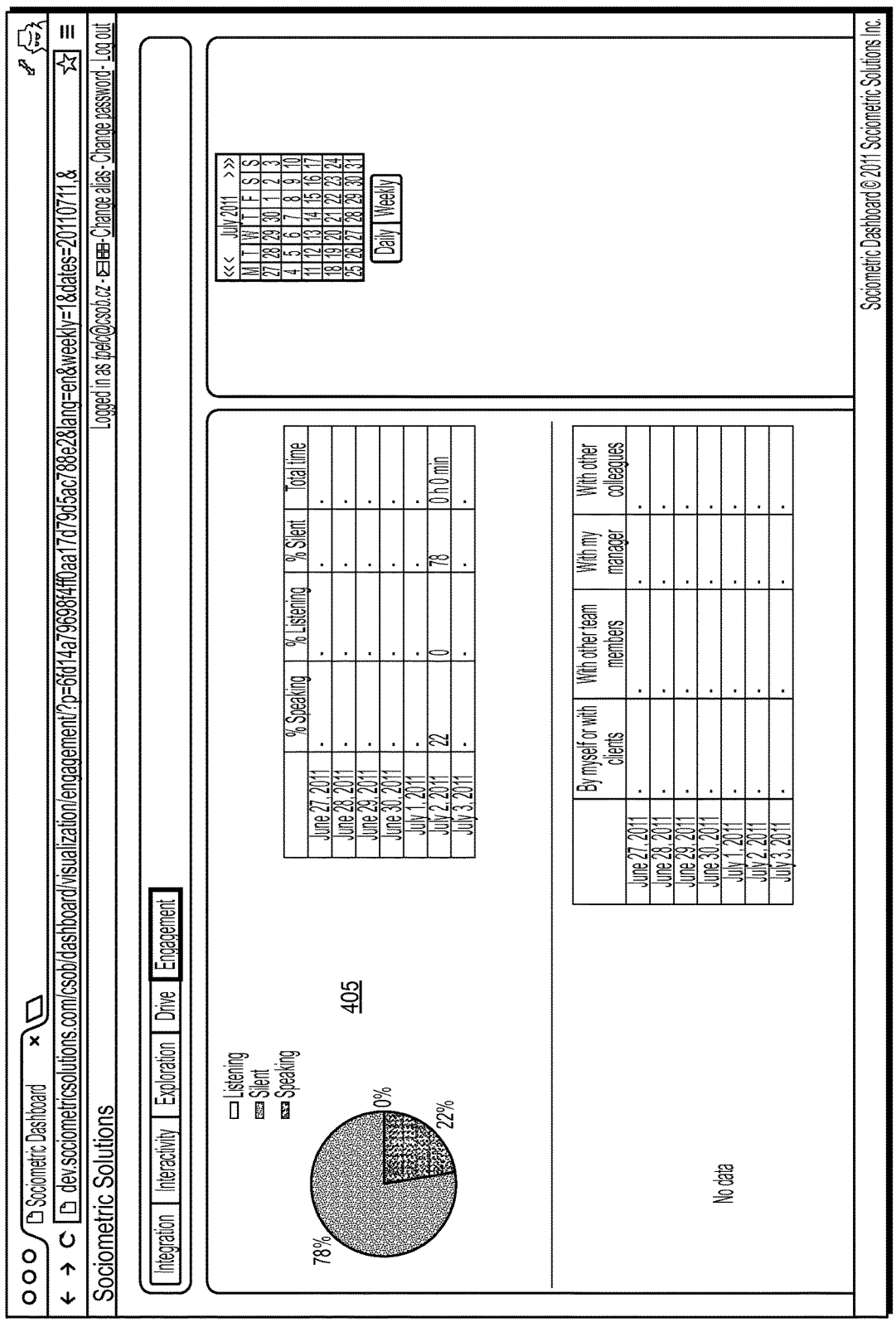

FIG. 4F is an example graphical user interface screen view generated to demonstrate or otherwise illustrate an individual's speech profile. The visualization area 405 illustrates a pie graph of an individual's speech profile. The speech profile can illustrate the time an individual spends silent, the time an individual spends listening, and the time an individual spends speaking, or respective percentages thereof. This data can be detected by any speech detection algorithm (e.g., energy based, clustering based, etc.). "Listening" is tagged if someone in the individual's interaction group other than the individual is speaking at the same time the individual is present. "Overlap" is tagged if someone from the interaction group speaks when the individual is speaking Individual participation is the speaking time divided by the total speaking time within a current interaction group. Dominance is based on the number of successful and unsuccessful interruptions, the number of turns, and the individual's participation score.

Additional turn-taking metrics that can be measured and displayed include number of turns, number of pauses, number of successful interruptions, number of unsuccessful interruptions, average turn length, average pause length, turn-taking matrix, speaking time, silence time, listening time, overlapping speech time, dominance, interactivity, participation percentage, participation balance, and turn-taking balance.

Figure 5:
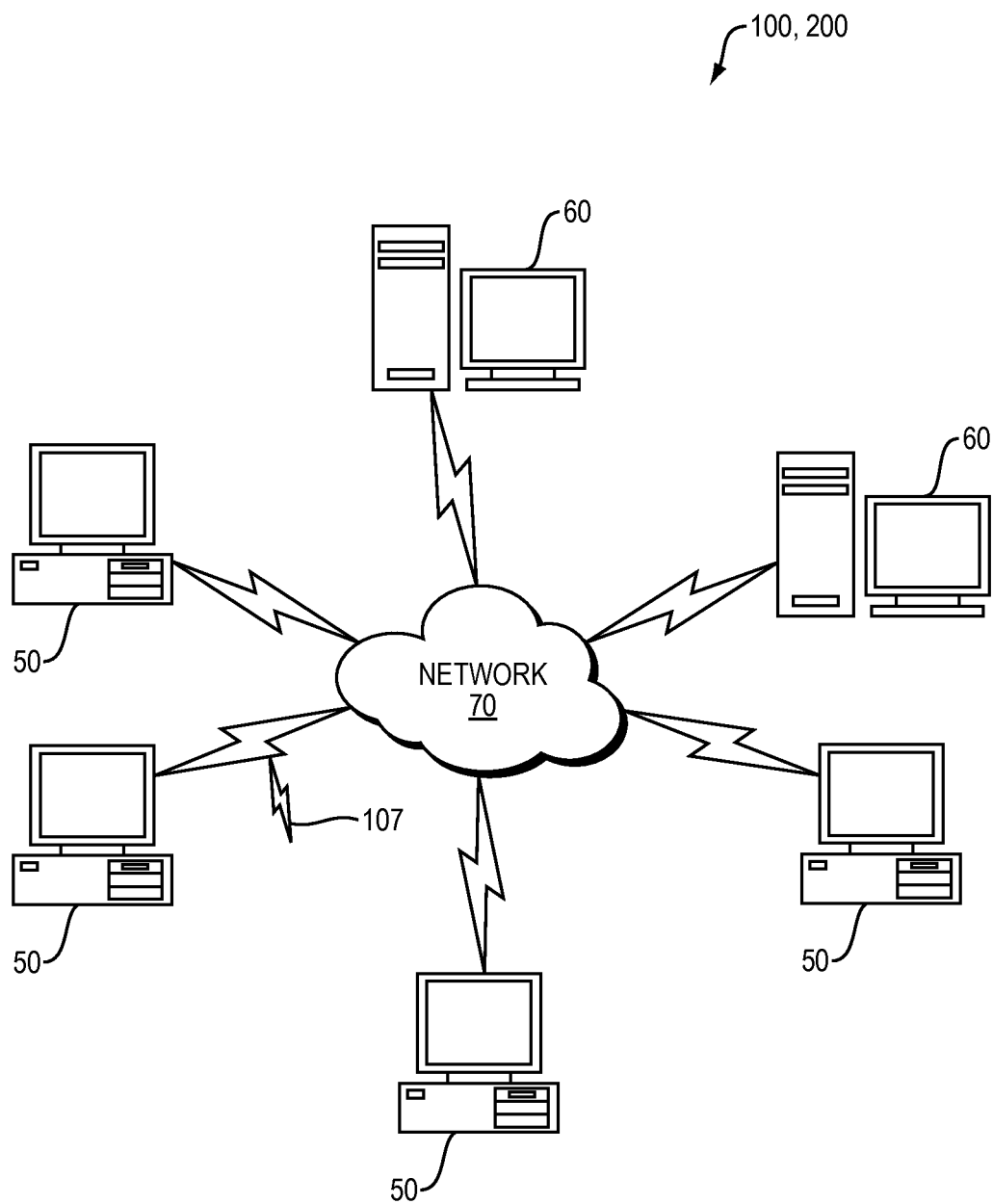
FIG. 5 illustrates a computer network or similar digital processing environment in which the present invention may be implemented.

FIG. 5 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Client devices/computers 50 implement badges (sensors) 205 and computers 225 described above, and servers 60 implement base stations 210, central computers 215 and servers 220 described above. Other electronic device/computer network architectures are suitable.

Figure 6:
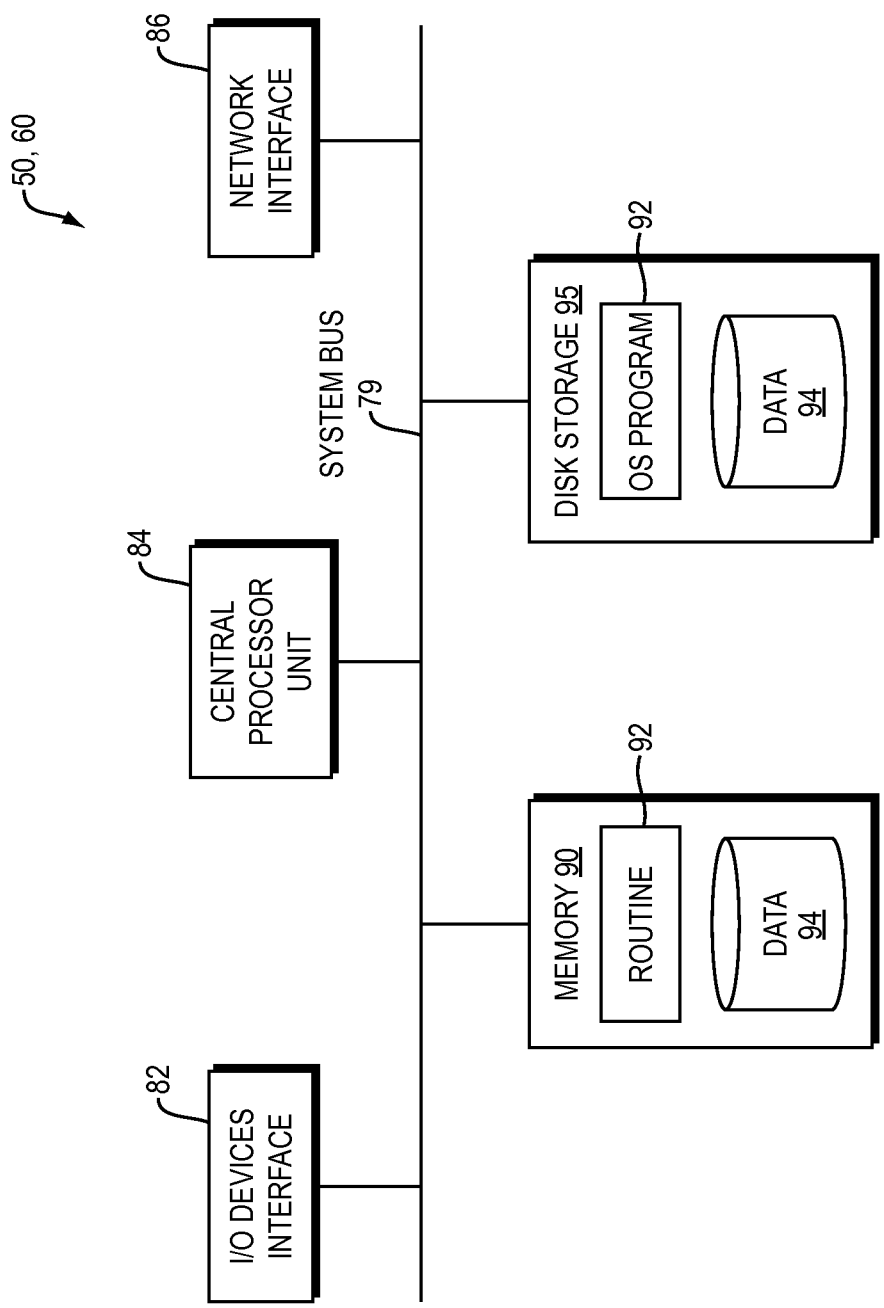
FIG. 6 is a diagram of the internal structure of a computer (e.g., client processor/device or server computers) in the computer system of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., sensor data analysis, visualization of calculated metrics, user interface of same and supporting code 100 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of tracking human interactions using electronic sensors, the method comprising:
    providing a first wearable electronic badge to be worn by a first person and a second wearable electronic badge to be worn by a second person, each wearable electronic badge comprising a plurality of sensors capturing sensor data, the plurality of sensors including a wireless communication module and a compass;
    measuring an orientation of the first person using the compass of the first wearable electronic badge;
    measuring an orientation of the second person using the compass of the second wearable electronic badge;
    measuring a wireless signal strength between the first wearable electronic badge and the second wearable electronic badge, the measured wireless signal strength being representative of a distance between the first person and the second person;
    transmitting from the wearable electronic badges being worn captured sensor data to a server via a base station or directly via the wireless communication module, the captured sensor data including the measured orientations and the measured wireless signal strength;
    in response to the server receiving the transmitted sensor data, analyzing the captured sensor data and calculating a plurality of human interaction metrics, said analyzing the captured sensor data including determining existence of an interaction between the first person and the second person by comparing the measured orientations in combination with the measured wireless signal strength; and
    creating and displaying on a computer screen a visualization of the calculated plurality of human interaction metrics according to at least one user specification.

2. The method of claim 1, wherein the plurality of sensors capturing sensor data of each wearable electronic badge further includes an infrared sensor, a camera, an accelerometer and a plurality of microphones, and the captured sensor data further includes data about the person wearing the respective wearable electronic badge, including at least one of: proximity to another person, direct face-to-face interaction, location, individual speech patterns, conversational turn-taking patterns, orientation, body movement patterns, and posture patterns.

3. The method of claim 2, wherein the captured sensor data further includes information regarding interactions with a third person.

4. The method of claim 3, wherein the third person is not wearing a wearable electronic badge and the camera of the first wearable electronic badge is used to detect the third person's face, and said analyzing the captured sensor data further includes utilizing said detection of the third person's face in combination with other captured sensor data from the plurality of sensors to determine when the first and third persons are having a conversation.

5. The method of claim 3 further including determining an interaction between the first person and the third person by utilizing a combination of at least two of the following: the infrared sensor, the wireless communication module, the compass, and the camera.

6. The method of claim 1, wherein the plurality of sensors capturing sensor data of each wearable electronic badge further includes an infrared sensor, a camera, an accelerometer and a plurality of microphones, and the captured sensor data further includes data about the person wearing the respective wearable electronic badge, including conversational turn-taking patterns of the person, said conversational turn-taking patterns being measured by a combination of at least two of the following: the infrared sensor, the wireless communication module, the compass, the camera, and the plurality of microphones.

7. The method of claim 6, wherein the plurality of human interaction metrics include a plurality of conversational turn-taking metrics, said plurality of conversational turn-taking metrics including at least one of: number of turns taken, number of pauses, number of successful interruptions, number of unsuccessful interruptions, average turn length, average pause length, turn-taking matrix, speaking time, silence time, listening time, overlapping speech time, dominance, interactivity, participation percentage, participation balance, and turn-taking balance.

8. The method of claim 1, wherein the wearable electronic badges are implemented into an existing personnel identification network, and
    for each wearable electronic badge, a unique identification number is assigned by the existing personnel identification network and communicated to the wearable electronic badge through the wireless communication module, or manually assigned.

9. The method of claim 1, wherein the plurality of human interaction metrics are at least one of: a plurality of social network metrics, a plurality of conversational turn-taking metrics, or a plurality of social signaling metrics.

10. The method of claim 1, wherein analyzing the captured sensor data includes mathematically representing a plurality of persons as a graph of nodes, each node representing a person in relation to the other persons of the plurality of persons; and
    wherein the plurality of human interaction metrics include a plurality of social network metrics, said plurality of social network metrics including at least one of:

betweenness centrality, degree centrality, cohesion, integration, and exploration, betweenness centrality being defined as a number of shortest paths from all end nodes to all other nodes that pass through a node in the graph of nodes, degree centrality being defined as a number of ties that a node has in the graph of nodes, cohesion being defined as a minimum number of nodes in the graph of nodes that need to be removed in order to disconnect a group of nodes, integration being defined as a number of triads that a node is part of divided by a maximum number of possible triads, and exploration being defined as a percentage of time that a person of a group of persons has spent with people outside of the group divided by total interaction time of the person.

11. The method of claim 1, wherein the plurality of human interaction metrics include a plurality of social signaling metrics, said plurality of social signaling metrics including include at least one of: activity, consistency, mirroring, and influence; and the plurality of social signaling metrics are calculated by any of: body movement patterns, individual speech patterns, and conversational turn-taking patterns.

12. The method of claim 1, wherein the visualization of the plurality of human interaction metrics illustrate the relationship between any one of the plurality of human interaction metrics and a set of performance metrics, the set of performance metrics selected from: productivity, job satisfaction, employee engagement, and drive.

13. The method of claim 12, wherein the visualization further illustrates correspondence between a change in the performance metrics and a change in sensed human interaction.

14. The method of claim 1, wherein the visualization of the plurality of metrics further includes a visualization of the plurality of human interaction metrics according to location.

15. The method of claim 1, wherein the wireless communication module is an electromagnetic data transfer module, the electromagnetic data transfer module being at least one of: a near field communication (NFC) module and a radio frequency identification (RFID) module.

16. The method of claim 1, wherein the plurality of human interaction metrics are calculated for respective locations of different interactions between persons wearing the wearable electronic badges, wherein the respective locations of the different interactions are determined from the captured sensor data, or from the wearable badges proximity to one or more base stations, each base station having a known location.

17. A system for tracking human interactions using electronic sensors, the system comprising:

a first wearable electronic badge to be worn by a first person and a second wearable electronic badge to be worn by a second person, each wearable electronic badge comprising a plurality of sensors capturing sensor data, the plurality of sensors including a wireless communication module and a compass;

one or more base stations configured to receive the captured sensor data from the wearable electronic badges;

a server configured to: (i) receive the captured sensor data from the one or more base stations or the wearable electronic badges, the captured sensor data including an orientation of the first person measured by the compass of the first wearable electronic badge, an orientation of the second person measured by the compass of the second wearable electronic badge, and a measured wireless signal strength between the first wearable electronic badge and the second wearable electronic badge, the measured wireless signal strength being representative of a distance between the first person and the second person, and (ii) analyze the captured sensor data and calculate a plurality of human interaction metrics, said analyzing the captured sensor data including determining existence of an interaction between the first person and the second person by comparing the measured orientations in combination with the measured wireless signal strength; and a user terminal having a processor and a display monitor, the user terminal providing a visualization of the calculated plurality of human interaction metrics by rendering the visualization on the display monitor according to at least one user specification.

18. The system of claim 17, wherein the plurality of sensors capturing sensor data of each wearable electronic badge further includes an infrared sensor, a camera, an accelerometer and a plurality of microphones, and the captured sensor data further includes data about the person wearing the respective wearable electronic badge, including at least one of: proximity to another person, direct face-to-face interaction, location, individual speech patterns, conversational turn-taking patterns, orientation, body movement patterns, and posture patterns.

19. The system of claim 18, wherein the captured sensor data further includes information regarding interactions with a third person.

20. The system of claim 18, wherein the wireless communication module is an electromagnetic data transfer module, the electromagnetic data transfer module being at least one of: a near field communication (NFC) module and a radio frequency identification (RFID) module.

21. The system of claim 19, wherein the third person is not wearing a wearable electronic badge and the camera of the first wearable electronic badge is used to detect the third person's face, and said analyzing the captured sensor data further includes utilizing said detection of the third person's face in combination with other captured sensor data from the plurality of sensors to determine when the first and third persons are having a conversation.

22. The system of claim 19, wherein the server is further configured to determine an interaction between the first person and the third person by utilizing a combination of at least two of the following: the infrared sensor, the wireless communication module, the compass, and the camera.

23. The system of claim 17, wherein the plurality of sensors to capture sensor data of each wearable electronic badge further includes an infrared sensor, a camera, an accelerometer and a plurality of microphones, and the captured sensor data further includes data about the person wearing the respective wearable electronic badge, including conversational turn-taking patterns of the person, said conversational turn-taking patterns being measured by a combination of at least two of the following: the infrared sensor, the wireless communication module, the compass, the camera, and the plurality of microphones.

24. The system of claim 23, wherein the plurality of human interaction metrics include a plurality of conversational turn-taking metrics, said plurality of conversational turn-taking metrics including further include at least one of: number of turns taken, number of pauses, number of successful interruptions, number of unsuccessful interruptions, average turn length, average pause length, turn-taking matrix, speaking time, silence time, listening time, overlapping speech time, dominance, interactivity, participation percentage, participation balance, and turn-taking balance.

25. The system of claim 17, wherein the wearable electronic badges are implemented into an existing personnel identification network, and for each wearable electronic badge, a unique identification number is assigned by the existing personnel identification network and communicated to the wearable electronic badge through the wireless communication module, or manually assigned.

26. The system of claim 17, wherein the plurality of human interaction metrics are at least one of: a plurality of social network metrics, a plurality of conversational turn-taking metrics, or a plurality of social signaling metrics.

27. The system of claim 17, wherein said analyzing the captured sensor data includes mathematically representing a plurality of persons as a graph of nodes, each node representing a person in relation to the other persons of the plurality of persons; and wherein the plurality of human interaction metrics include a plurality of social network metrics, said plurality of social network metrics including include at least one of: betweenness centrality, degree centrality, cohesion, integration, and exploration, betweenness centrality being defined as a number of shortest paths from all end nodes to all other nodes that pass through a node in the graph of nodes, degree centrality being defined as a number of ties that a node has in the graph of nodes, cohesion being defined as a minimum number of nodes in the graph of nodes that need to be removed in order to disconnect a group of nodes, integration being defined as a number of triads that a node is part of divided by a maximum number of possible triads, and exploration being defined as a percentage of time that a person of a group of persons has spent with people outside of the group of persons divided by total interaction time of the person.

28. The system of claim 17, wherein the plurality of human interaction metrics include a plurality of social signaling metrics, said plurality of social signaling metrics including include at least one of: activity, consistency, mirroring, and influence; and the plurality of social signaling metrics are calculated from any of: body movement patterns, individual speech patterns, and conversational turn-taking patterns.

29. The system of claim 17, wherein the visualization of the plurality of human interaction metrics illustrate the relationship between any one of the plurality of human interaction metrics and a set of performance metrics, the set of performance metrics selected from: productivity, job satisfaction, employee engagement, and drive.

30. The system of claim 29, wherein the visualization further illustrates correspondence between a change in the performance metrics and a change in sensed human interaction.

31. The system of claim 17, wherein the visualization of the plurality of metrics further includes a visualization of the plurality of human interaction metrics according to location.

32. The system of claim 17, wherein the plurality of human interaction metrics are calculated for respective locations of different interactions between persons wearing the wearable electronic badges, wherein the respective locations of the different interactions are determined from the captured sensor data, or from the wearable badges proximity to one or more base stations, each base station having a known location.

* * * * *